United States Patent [19]

Kolodziejczyk

[11] 4,359,822
[45] Nov. 23, 1982

[54] POWER CHAIN SAW HANDLE ATTACHMENT

[76] Inventor: John P. Kolodziejczyk, Rte. 2, Box 378A, Ironwood, Mich. 49938

[21] Appl. No.: 20,633

[22] Filed: Mar. 15, 1979

[51] Int. Cl.³ ............................................. B27B 17/00
[52] U.S. Cl. .................................. 30/296 R; 30/122; 30/382; 173/170
[58] Field of Search ...................... 30/166 R, 122, 381, 30/382, 383, 296 R; 173/170

[56] References Cited

U.S. PATENT DOCUMENTS

| | | | |
|---|---|---|---|
| 3,713,466 | 1/1973 | Lund | 30/166 |
| 3,949,817 | 4/1976 | Rice | 30/296 R |
| 4,145,810 | 3/1979 | Belliston | 30/296 R |

Primary Examiner—Jimmy C. Peters
Attorney, Agent, or Firm—Peck & Peck

[57] ABSTRACT

A handle attachment for power chain saws to extend the use of the basic chain saw structure for cutting underbrush, weeds and the like. The curved handle attachment is detachably pivotally fixed on the body of the power chain saw and positions the cutting bar in a horizontal position instead of the conventional vertical position when the chain saw is being operated in a normal manner to cut wood. The handle attachment is adjustable to accommodate users of different height and such adjustability includes a link bar pivotally connected at one end to the handle and pivotally connected at the other end to the conventional chain saw handle. The handle of the chain saw attachment is provided with an adjustable position hand grip and a throttle control assembly. The saw bar of the chain saw is provided with a guard which functions not only as a stand but also prevents the chain having the cutting teeth thereon from striking the ground and this also permits the user or operator to rest without releasing the handle and also permits the tool or chain saw to stand independently.

3 Claims, 5 Drawing Figures

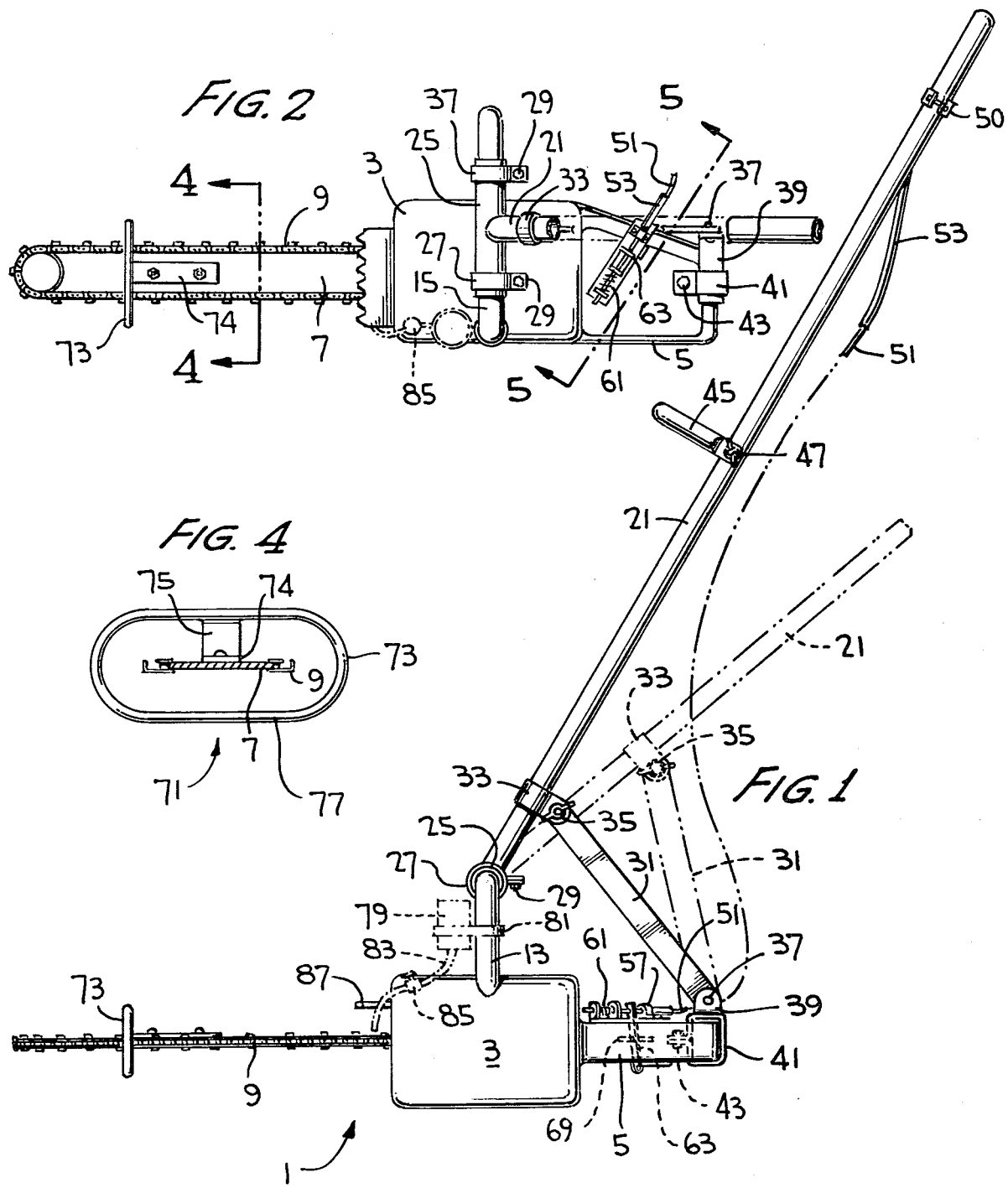

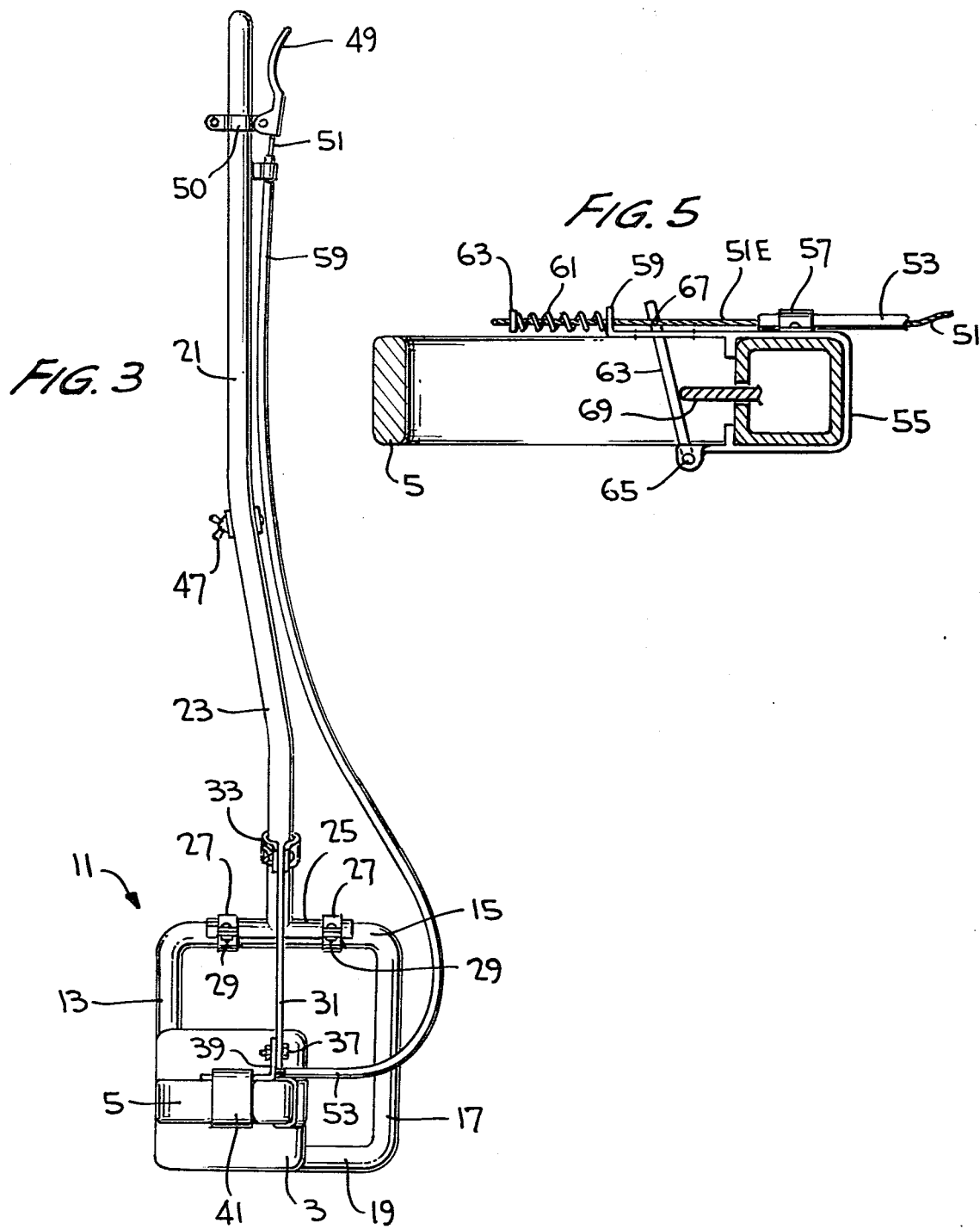

4,359,822

POWER CHAIN SAW HANDLE ATTACHMENT

BRIEF SUMMARY OF THE INVENTION

In the conventional use of chain saws whether powered by gas or electric means the cutting bar is disposed in vertical position. This invention provides means easily attachable to and detachable from a conventional chain saw whereby the cutting bar is disposed in horizontal position rather than in normal usage vertical position. The positioning of the chain saw cutting bar in horizontal position with respect to the ground permits the chain saw to be operated for cutting underbrush, weeds and the like. When it is used in this horizontal position it is operated at or near ground level and the operator of the saw in such horizontal position may walk or stand while operating the saw to cut the underbrush and the like.

The handle attachment or auxiliary handle is detachably connected to the power saw and is adjustable to accommodate operators of different statures and heights. It is easily attachable to and detachable from the power saw and in order to provide the adjustable characteristics the lower end of the handle is pivotally and detachably connected to rigid handle supporting means fixed to the body of the chain saw. A supporting assembly is pivotally and removably connected to the handle at one end while at the other end it is pivotally connected, preferably to the conventional handle of the power saw. The adjustable features are operable with facility and permit the handle to assume different angles with respect to the body of the chain saw so as to be easily usable for accomplishing the purposes for which it is designed. An adjustable hand grip is provided on the handle as well as a throttle control means. It is to be understood that the attachment of this handle to the chain saw does not in any way affect the conventional use of the chain saw after the handle attachment is removed.

Means have also been devised to provide a combination saw bar guard and stand to prevent the chain of the chain saw from striking the ground and this guard permits the operator to rest without releasing the tool and it also allows it to stand independently of the operator.

If the chain saw is gasoline operated I have provided a throttle control which is removably affixed to the curved handle and extends to the conventional handle of the power saw. It is also within my contemplation to provide removable means in the nature of a drip oiler for the teeth and bar of the saw. This drip oiler may be attached to the curved handle or to the means which will be described hereinafter to which the curved handle is removably attached.

Additional objects and advantages of the present invention will become more readily apparent to those skilled in the art when the following general statements and descriptions are read in the light of the appended drawings.

BRIEF DESCRIPTION OF THE SEVERAL VIEWS OF THE DRAWINGS

FIG. 1 is a side elevational view of the power chain saw with the handle attachment adjustably fixed thereto and with the chain saw in horizontal position for use in cutting underbrush and the like.

FIG. 2 is a top plan view of the chain saw with parts thereof broken away.

FIG. 3 is a rear elevational view of the chain saw with the handle attachment adjustably affixed thereto.

FIG. 4 is a view taken on the line 4—4 of FIG. 2.

FIG. 5 is a view taken on the line 5—5 of FIG. 2 and illustrating in section the throttle actuating mechanism.

DETAILED DESCRIPTION

In the accompanying drawings I have illustrated the means which I have devised for converting a conventional power operated chain saw into a saw for cutting underbrush, weeds and the like. The innovation contemplates the removable attachment of an elongated curved handle to the power saw, the handle being so positioned on the body of the power saw that the saw bar and cutting teeth are disposed horizontally with respect to the ground to facilitate the cutting of underbrush and the like. This is all accomplished without in any way changing the use of the power saw in its conventional manner with the cutting bar and cutting teeth in the conventional vertical position. The means which are removably attached to the power saw to automatically position the saw bar and the cutting teeth in the aforesaid horizontal position may be removed with facility from the power saw so that it may be operated in the conventional manner of power saws with the cutting bar and cutting teeth in the conventional vertical position.

The power saw is generally designated by the numeral 1 and consists of a body portion 3 the conventional handle 5 projecting from one end of the body 3 of the power saw and the cutting bar 7 projects from the other end of the power saw body. Operatively traveling on the bar 1 in a conventional manner which is well-known in the chain saw art is a chain of cutting teeth 9. Fixed in any suitable manner to the body 3 of the chain saw is an upstanding generally circular angular handle supporting element generally designated by the numeral 11. This supporting element 11 consists of an upstanding arm 13 fixed at one end to the body 3 of the chain saw in any suitable manner, a transverse member 15 extending from the upper end of the member 13, a vertical member 17 extending downwardly from the transverse member 15, and a lower member 19 extending from the lower end of the member 17 toward the chain saw body 3 and fixed thereto in any suitable manner.

An elongated curved auxiliary handle 21, the curvature of this handle being illustrated at 23 to facilitate the proper operation of the chain saw by the user thereof when the cutting bar 7 and cutting teeth 9 are in horizontal position. The curved handle 21 is removably attached to the transverse member 15 of the handle supporting element 11 in a manner as will be explained. The lower end of the curved handle is provided with a semi-circular transversely extending member 25. The member 25 is preferably of substantially half the circumferential dimension of the transverse member 15 and when the handle attachment is being connected to the conventional power saw the member 25 is mated with the upper portion of the transverse member 15 in a manner as particularly illustrated in FIGS. 1 and 3 of the drawings. As has been stated the handle attachment 21 is removably attached to the chain saw so that when it is detached therefrom the chain saw may be used in its conventional manner. A pair of clamping elements 27 are provided which include strap-like members encircling the member 25 and the transverse member 15, the straps being releasably clamped to members 25 and 15 by means of nuts and bolts and the like 29 to tighten and loosen straps 27. It is to be understood that the member 25 is positioned on the transverse member 15 so that the ends thereof are substantially equidistant from the members 13 and 17. It will now be appreciated that by an easy operation the member 25 which is on the lower end of the handle may be detached from the transverse member 15 of the power saw.

In order to accommodate the height and general stature of the operator of the chain saw when the handle 21 has been applied thereto it is desirable to provide means for adjusting the position of the handle. This is achieved by means of a link 31 which at its upper end is pivotally connected to a clamp 33 which extends about the handle, the point of pivotal connection being illustrated at 35. At its other end the link 31 is pivotally connected at 37 to an upstanding element 39 which is fixed to a supporting means 41 which extends about the handle 5 and is detachably affixed thereto as at 43. It will now be evident that if it is desired to lower the handle 21 into the position illustrated in phantom lines in FIG. 1 it is merely necessary to loosen the clamp 33 and slide it upwardly on the handle, the lower end of the link being pivotally mounted as at 37 so that such link may assume the phantom line position shown in FIG. 1, and the clamping elements must be loosened. Obviously these various means must be tightened when the handle has been adjusted to its desired position.

An adjustable hand grasp 45 is positioned on the handle 21 and is releasably clamped thereto by clamp 47 so that the position of the hand grasp may be altered, in other words, the hand grasp 45 may be slid to any desired position along the handle. A throttle control lever 49 is adjustably mounted on the handle 21 by any suitable clamping means 50. Attached to the throttle lever 49 is a cable 51 which is preferably movably sheathed in a tubular enclosure 53.

Any suitable type of throttle supporting means 55 is associated with the handle 5 so that it enfolds three sides of the handle. The throttle control means is fixed to this member 55 as at 57 and the cable extends as at 51E slideably through an upstanding lip 59 and is spring biased by means of a spring 61, the end of the cable having a spring abutting means 63' thereon. A trigger operating lever 63 is pivotally connected as at 65 to member 55 and is fixed to the cable extension 51E as at 67. The lever 63 operatively abuts a finger trigger 69 to control the fuel feed to the chain saw motor. Thus, when the power control lever 49 is operated the lever 63 which abuts the finger trigger will force it inwardly to control the fluid flow and when the lever 63 is pulled toward the right as seen in FIG. 5 the spring 61 will be compressed so that when tension is released from the throttle control lever 49 the lever 63 will assume the position illustrated in FIG. 5. It will be apparent from consideration of FIG. 5 that the finger trigger 69 operatively extends through an opening in the handle 5.

A guard and stand has been particularly designed for use when the saw is being used with the cutting bar and cutting teeth in horizontal position with respect to the ground. Such guard has been designated in the drawings in its entirety by the numeral 71 and consists of an oval ring 73 which is removably fixed to the cutting bar 7 by means of a bracket which is removably fixed to the cutting bar 7 as at 74 and this bracket is provided with an upstanding leg 75 which is fixed to the ring 73 in any suitable manner. It will now be apparent that I have provided a combination saw bar guard and stand, and the oval ring 73 thereof prevents the cutting teeth 9 of the chain from striking the ground and permits the operator to rest without releasing the tool and also allows the tool to stand independently. It is the oval configuration of the ring which permits the operator to rest or for the tool to stand independently since the oval ring provides a generally flat lower or base portion 77.

For chain saws that are not self-oiling I provide a visible oil container 79 which may be attached to either the handle 21 or the element 11 by means of a clamping element 81. Tubing 83 extends from the bottom of the container 79 to permit oil to drip on the chain saw. A needle valve shutoff 85 may be provided in the tubing 83 as well as means 87 of any suitable kind may be provided to direct the outlet of the tubing 83 so that it will fall on the bar and chain where desired.

It is significant that the handle supporting element 11 and its components are fastened to the body 3 of the chain saw in a location which is transverse to the projected planes of the cutting bar 7 when the cutting bar and chain cutting teeth 9 are in horizontal position with respect to the ground. It will thus be appreciated that when the handle 21 is attached to the transverse member 15, located as described, the cutting bar 7 will automatically be disposed in horizontal position with the ground.

What is claimed is:

1. A power chain saw including, in combination, a chain saw having a body, a handle projecting from one end thereof, and a cutting bar and cutting teeth projecting from the other end thereof, and said power chain saw body having an auxiliary handle supporting element fixed thereto and said element including a transverse member in a plane above and transversely positioned with respect to a projected plane of said cutting bar when said cutting bar is in horizontal position with respect to the ground, rigid members connected to opposite ends of said transverse member and depending therefrom and connected at their lower ends to the body of the saw thereby spacing the transverse member in a plane above the body of the power chain saw, and an upstanding auxiliary handle detachably fixed to said transverse member said auxiliary handle includes means mating with said transverse member and clampable thereto so that said means and upstanding auxiliary handle may be pivoted with respect to the transverse member for adjusting the angular relationship of said handle with respect to said transverse member, the auxiliary handle extending from said supporting element for controlling the operation of said power chain saw when said cutting bar is in horizontal position with respect to the ground.

2. A power chain saw including, in combination, a chain saw having a body, a handle projecting from one end thereof and a cutting bar and cutting teeth projecting from the other end thereof, said power chain saw body having an auxiliary handle supporting element fixed thereto and said element including a transverse member, said transverse member being in a plane above and transversely positioned with respect to a projected plane of said cutting bar when said cutting bar is in horizontal position with respect to the ground, an upstanding auxiliary handle detachably fixed to said transverse member of said auxiliary handle supporting element and pivoted with respect thereto and extending therefrom for controlling the operation of said power chain saw when said cutting bar is in horizontal position with respect to the ground and a guard and stand is provided for preventing the cutting teeth from engaging the ground when the power chain saw is being operated with the cutting bar thereof horizontal to the ground, said guard and stand including means detachably fixed at one end to the cutting bar and mounting on the other end thereof an ovate loop which is spaced from the cutting bar.

3. A power chain saw in accordance with claim 2, wherein a portion of said ovate loop provides a relatively plane portion for contact with the ground and for providing a stable support upon which the power chain saw may rest.

* * * * *